(No Model.)

C. S. DIKEMAN.
WHEEL RIM.

No. 509,021. Patented Nov. 21, 1893.

Witnesses
E. J. Nottingham
G. F. Downing

Inventor
C. S. Dikeman
By H. A. Seymour
Attorney

THE NATIONAL LITHOGRAPHING COMPANY,
WASHINGTON, D. C.

UNITED STATES PATENT OFFICE.

CHARLES S. DIKEMAN, OF TORRINGTON, CONNECTICUT.

WHEEL-RIM.

SPECIFICATION forming part of Letters Patent No. 509,021, dated November 21, 1893.

Application filed April 21, 1893. Serial No. 471,338. (No model.)

*To all whom it may concern:*

Be it known that I, CHARLES S. DIKEMAN, of Torrington, in the county of Litchfield and State of Connecticut, have invented certain new and useful Improvements in Wheel-Rims for Pneumatic Tires; and I do hereby declare the following to be a full, clear, and exact description of the invention, such as will enable others skilled in the art to which it appertains to make and use the same.

My invention relates to an improvement in wheel rims for pneumatic tires, the object being to strengthen and reinforce the rim at the point where the ends are joined together.

A further object is to strengthen the rim at the point where the hole is formed for the tire valve.

With these objects in view my invention consists in a rim the ends of which are overlapped and joined together, in connection with a reinforce clip secured across the joined ends.

It also consists in a rim the ends of which are secured together and provided with a hole at or near the joint thus formed in connection with a reinforce clip secured across the joint and provided with a hole adapted to align with the hole in the rim whereby the rim is made strong at the point or points which heretofore have been weak from the fact that the joint or the valve hole has materially decreased the strength.

My invention further consists in certain novel features of construction and combinations of parts which will be hereinafter described and pointed out in the claims.

Figure 1:
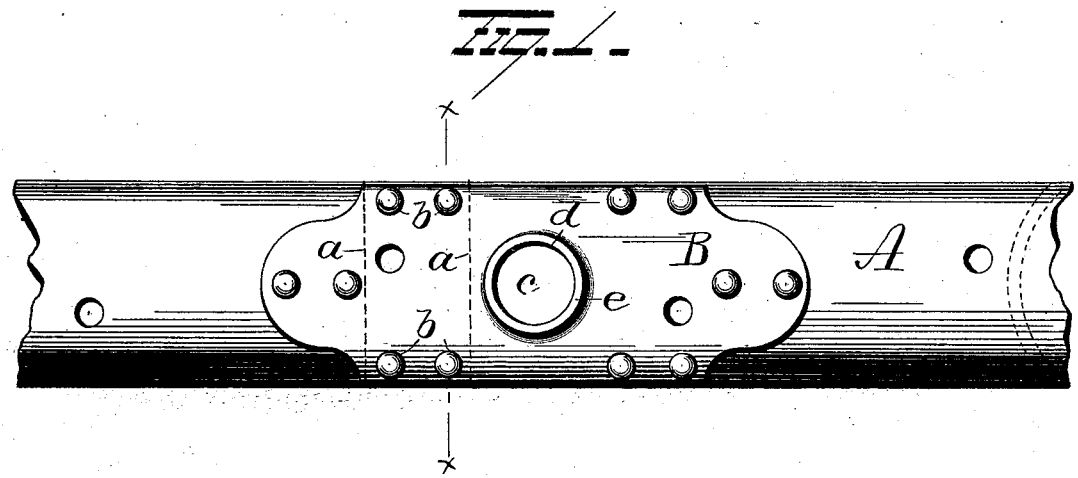
Figure 2:
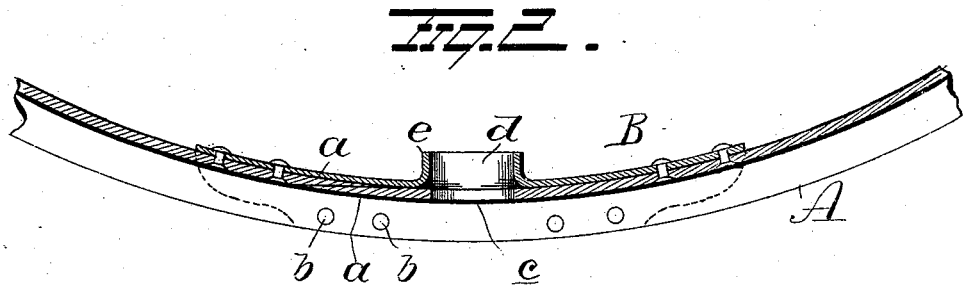
Figure 3:
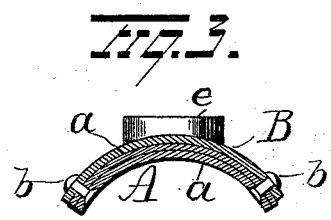
Figure 4:
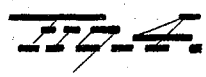
Figure 4:
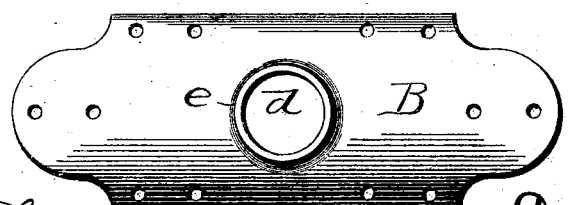

In the accompanying drawings, Figure 1 is a view of the rim. Fig. 2 is a sectional view. Fig. 3 is a sectional view on line $x$—$x$ of Fig. 1; and Fig. 4 is a detached view of one of the reinforcing clips.

A represents the rim. This may be made in the usual manner of any preferred material as steel for instance, or of aluminum which I prefer to use. The ends $a$, $a$, are preferably scarfed and joined by welding if desired or better still by rivets $b\ b$ as shown for the reason that it is extremely difficult to make a strong weld in aluminum. After being thus secured together by a scarf weld or a scarf joint, the joint thus formed at best is weak and necessarily the weakest point in the rim. To compensate for this however, I rivet or otherwise secure a reinforcing clip B to the inner face of the rim at the joint. The rivets, when rivets are used are passed through the scarfed or overlapped ends and also through the rim at each side of the joint as shown. Another weak point in the rim is at the place where the hole is formed for the valve and instead of using another clip to reinforce the rim at the point where this hole is located, I form the hole $c$ at or as near as possible to the joint and provide the reinforcing clip with a hole $d$ in position to align with the hole $c$ in the rim and in forming the hole in the clip, the metal is flanged out to form a flange $e$ as shown. In this manner the rim instead of being weak at these points is really made stronger than at any other place in it and it is done in a simple and inexpensive manner.

It is evident that slight changes might be resorted to in the form and arrangement of the several parts described without departing from the spirit and scope of my invention and hence I do not wish to limit myself to the exact construction herein set forth; but, Having fully described my invention, what I claim as new, and desire to secure by Letters Patent, is—

1. The combination with a wheel rim curved transversely to form a groove for a tire the ends of the rim scarfed and made to fit each other, of a reinforcing clip secured over the united ends of the rim, substantially as set forth.

2. The combination with a wheel rim the ends of which are scarfed or overlapped and secured together, said rim provided with a hole at or near the point where the ends are joined, of a reinforcing clip provided with a hole adapted to align with the hole in the rim, said clip secured to the rim over the joint, substantially as set forth.

3. The combination with a wheel rim the ends of which are scarfed or overlapped and secured together, said rim provided with a hole at or near the point where the ends are joined, of a reinforcing clip provided with a flanged hole adapted to align with the hole in the rim, substantially as set forth.

In testimony whereof I have signed this specification in the presence of two subscribing witnesses.

CHARLES S. DIKEMAN.

Witnesses:
W. CLARENCE DUVALL,
GEO. F. DOWNING.